United States Patent
Wang et al.

(10) Patent No.: US 9,612,746 B1
(45) Date of Patent: Apr. 4, 2017

(54) ALLOCATION METHOD FOR MEETING SYSTEM PERFORMANCE AND APPLICATION SERVICE LEVEL OBJECTIVE (SLO)

(71) Applicant: EMC Corporation, Hopkinton, MA (US)

(72) Inventors: Hui Wang, Upton, MA (US); Amnon Naamad, Brookline, MA (US); Xiaomei Liu, Southborough, MA (US); Owen Martin, Hopedale, MA (US); Sean Dolan, Belmont, MA (US); Malak Alshawabkeh, Franklin, MA (US); Alex Veprinsky, Brookline, MA (US); Adnan Sahin, Needham, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 91 days.

(21) Appl. No.: 14/751,861

(22) Filed: Jun. 26, 2015

(51) Int. Cl.
 *G06F 3/06* (2006.01)

(52) U.S. Cl.
 CPC .......... *G06F 3/0604* (2013.01); *G06F 3/0631* (2013.01); *G06F 3/0683* (2013.01)

(58) Field of Classification Search
 CPC .... G06F 3/0604; G06F 3/0683; G06F 3/0631; G06F 3/06
 See application file for complete search history.

(56) References Cited

U.S. PATENT DOCUMENTS

| | | | |
|---|---|---|---|
| 8,103,824 B2* | 1/2012 | Pollack | G06F 3/0605 711/114 |
| 8,266,406 B2* | 9/2012 | Kavuri | G06F 3/0605 711/170 |
| 8,306,926 B2* | 11/2012 | Prahlad | G06F 3/0605 705/400 |
| 8,706,993 B2* | 4/2014 | Prahlad | G06F 3/0605 705/400 |
| 8,713,261 B1* | 4/2014 | Aharoni | G06F 12/0868 711/137 |
| 8,725,980 B2* | 5/2014 | Kavuri | G06F 3/0605 711/170 |
| 8,806,165 B2* | 8/2014 | Selfin | G06F 3/061 711/103 |
| 2006/0236061 A1* | 10/2006 | Koclanes | G06F 3/0605 711/170 |
| 2008/0301255 A1* | 12/2008 | He | G06F 3/0605 709/214 |
| 2010/0281216 A1* | 11/2010 | Patel | G06F 12/121 711/118 |

(Continued)

*Primary Examiner* — Christopher D Birkhimer
(74) *Attorney, Agent, or Firm* — Anderson Gorecki LLP

(57) ABSTRACT

An efficient linear technique is used to determine allocation of tiered storage resources among data extents based on system performance and SLOs. Efficiency is achieved by first determining a system performance boundary condition via hardware performance modeling under desirable system performance zones. SLOs are then balanced and SLO achievement improved by exchanging workload activities among SG donors and SG receivers while system performance boundary conditions are maintained. Remaining unutilized capacity is the uniformly distributed to further improve SLO achievement.

20 Claims, 14 Drawing Sheets

(56) References Cited

U.S. PATENT DOCUMENTS

| | | | | |
|---|---|---|---|---|
| 2012/0137100 A9* | 5/2012 | Kavuri | ............... | G06F 3/0605 711/170 |
| 2013/0007402 A1* | 1/2013 | Prahlad | ............... | G06F 3/0605 711/170 |
| 2013/0124734 A1* | 5/2013 | Kavuri | ............... | G06F 3/0605 709/226 |
| 2013/0339972 A1* | 12/2013 | Zhang | ............... | G06F 9/5066 718/104 |
| 2014/0244955 A1* | 8/2014 | Kavuri | ............... | G06F 3/0605 711/162 |
| 2014/0310219 A1* | 10/2014 | Prahlad | ............... | G06F 3/0605 706/21 |
| 2015/0081871 A1* | 3/2015 | Labiaga | ............... | G06F 3/0659 709/223 |
| 2016/0117241 A1* | 4/2016 | Shah | ............... | G06F 12/0895 711/119 |

* cited by examiner

ALLOCATION METHOD FOR MEETING SYSTEM PERFORMANCE AND APPLICATION SERVICE LEVEL OBJECTIVE (SLO)

CROSS-REFERENCE TO RELATED APPLICATIONS

NA

BACKGROUND

Aspects of this disclosure are generally related to data storage systems. Data storage systems are used to maintain relatively large data sets and support a relatively large number of concurrent users. The basic building blocks of a data storage system may include storage arrays or storage server clusters. Examples of storage arrays, which will be used herein for the purposes of explanation, include the Symmetrix and VMAX families of storage array products of EMC Corporation. Each storage array typically includes multiple physical storage devices which are used to present logical storage devices to applications running on host devices. Different types of physical storage devices may be used, and those storage devices may be organized in hierarchical tiers based on technology type, where different technology types are associated with different levels of performance. Typically, the hierarchical tier on which an extent of data is stored is selected as a function of predicted activity of that extent. For example, recent access activity may be used as a predictor of future access activity (or future IO service demands). Logical storage devices created for an application may be organized in a storage group. The storage group may be associated with SLOs (service level objectives) which indicate the demands for quality of service measured by response time of IO access.

The virtualization layer associated with the relationship between the logical storage devices and the physical storage devices enables extents of a single logical device to be hosted by different physical storage devices. Moreover, those physical storage devices may be associated with different tiers, and extents may be dynamically moved between physical storage devices. Dynamic changes associated with the relationship between the extents and the underlying hosting storage media are transparent to the applications that read or write the extents. Although response time associated with the extents may change, the applications are not disrupted.

SUMMARY

All examples, aspects and features mentioned in this document can be combined in any technically possible way.

In accordance with an aspect, an apparatus comprises: a data storage system comprising: a plurality of non-transitory data storage devices each having a performance capability, where ones of the storage devices having a common performance capability are grouped together in a storage tier and the data storage system includes multiple storage tiers; a processor which presents logical storage devices to an application, the logical storage devices being backed by the non-transitory storage devices, ones of the logical storage devices being grouped together in a storage group, each storage group being associated with a service level objective, where the data storage system includes multiple storage groups; and a data movement engine configured to: calculate a projection of extents of data into ones of the storage tiers to improve satisfaction of the service level objectives of the storage groups while maintaining stable system performance, the projection based on a calculation for each extent comprising: expected activity of the extent; an amount by which the storage group associated with the extent is missing its service level objective, and a cost of more completely satisfying that service level objective of the storage group associated with the extent; and allocate storage capacity in accordance with the calculated projections. In some implementations the data movement engine is configured to calculate a projection of extents of data, based on expected activity of the extents, into ones of the storage tiers to realize stable data storage system performance which does not exceed the performance capabilities at each storage tier. In some implementations the data movement engine is configured to calculate the projection of extents for each tier of storage sequentially beginning with a highest performing storage tier. In some implementations the data movement engine is configured to project extents of data to improve satisfaction of service level objectives while maintaining stable system performance by swapping projections between storage groups. In some implementations the data movement engine is configured to project extents of data to improve satisfaction of service level objectives while maintaining stable system performance by swapping projections between first and second storage groups with less than complete satisfaction of their respective service level objectives. In some implementations the data movement engine is configured to project extents of data to improve satisfaction of service level objectives while maintaining stable system performance by swapping projections between storage groups based on storage group classifications. In some implementations the data movement engine is configured to project extents of data to improve satisfaction of service level objectives while maintaining stable system performance by uniformly projecting remaining unused storage capacity after swapping projections. In some implementations the data movement engine calculates a score S for each extent as follows:

$$S = e^{\alpha_i(\overline{rt_i} - rt_{i0})/min(rt_{i0}, \overline{rt_i})} \times \left( \beta_i \times \log\left( \frac{\sum_{k=0,\ldots,Max\_SG} \sum_{j=0,\ldots,Max\_extent} sgio_j^i}{\sum_{j=0,\ldots,max\_extent} sgio_j^i + 1} \right) + 1 \right) \times Activity$$

In some implementations the data movement engine calculates a threshold for projection into a storage tier and compares the score S with the threshold in order to qualify the extent to be moved into that tier.

In accordance with an aspect a method comprises: calculating a projection of extents of data into ones of the storage tiers to improve satisfaction of service level objectives of storage groups while maintaining stable system performance, the projection based on a calculation for each extent comprising: expected activity of the extent; an amount by which the storage group associated with the extent is missing its service level objective, and a cost of more completely satisfying that service level objective of the storage group associated with the extent; and allocating storage capacity in accordance with the calculated projections. In some implementations the method further comprises calculating a projection of extents of data, based on expected activity of the extents, into ones of a plurality of storage tiers to realize stable data storage system performance which does not exceed the performance capabilities at each storage tier. In some implementations the method further comprises calculating the projection of extents for each tier of storage sequentially beginning with a highest performing storage tier. In some implementations the method further comprises calculating the projection of extents of data to improve satisfaction of service level objectives while maintaining stable system performance by swapping projections between storage groups. In some implementations the method further comprises calculating the projection of extents of data to improve satisfaction of service level objectives while maintaining stable system performance by swapping projections between first and second storage groups with less than complete satisfaction of their respective service level objectives. In some implementations the method further comprises calculating the projection of extents of data to improve satisfaction of service level objectives while maintaining stable system performance by swapping projections between storage groups based on storage group classifications. In some implementations the method further comprises calculating the projection of extents of data to improve satisfaction of service level objectives while maintaining stable system performance by uniformly projecting remaining unused storage capacity after swapping projections. In some implementations the method further comprises calculating a score S for each extent as follows:

$$S = e^{\alpha_i (\overline{rt_i} - rt_{i0})/min(rt_{i0}, \overline{rt_i})} \times$$

$$\left( \beta_i \times \log \left( \frac{\sum_{k=0,\ldots,Max\_SG} \sum_{j=0,\ldots,Max\_extent} sgio_j^i}{\sum_{j=0,\ldots,max\_extent} sgio_j^i + 1} \right) + 1 \right) \times Activity$$

In some implementations the method further comprises calculating a threshold for projection into a storage tier and compares the score S with the threshold in order to qualify the extent to be moved into that tier.

DETAILED DESCRIPTION

Figure 1:
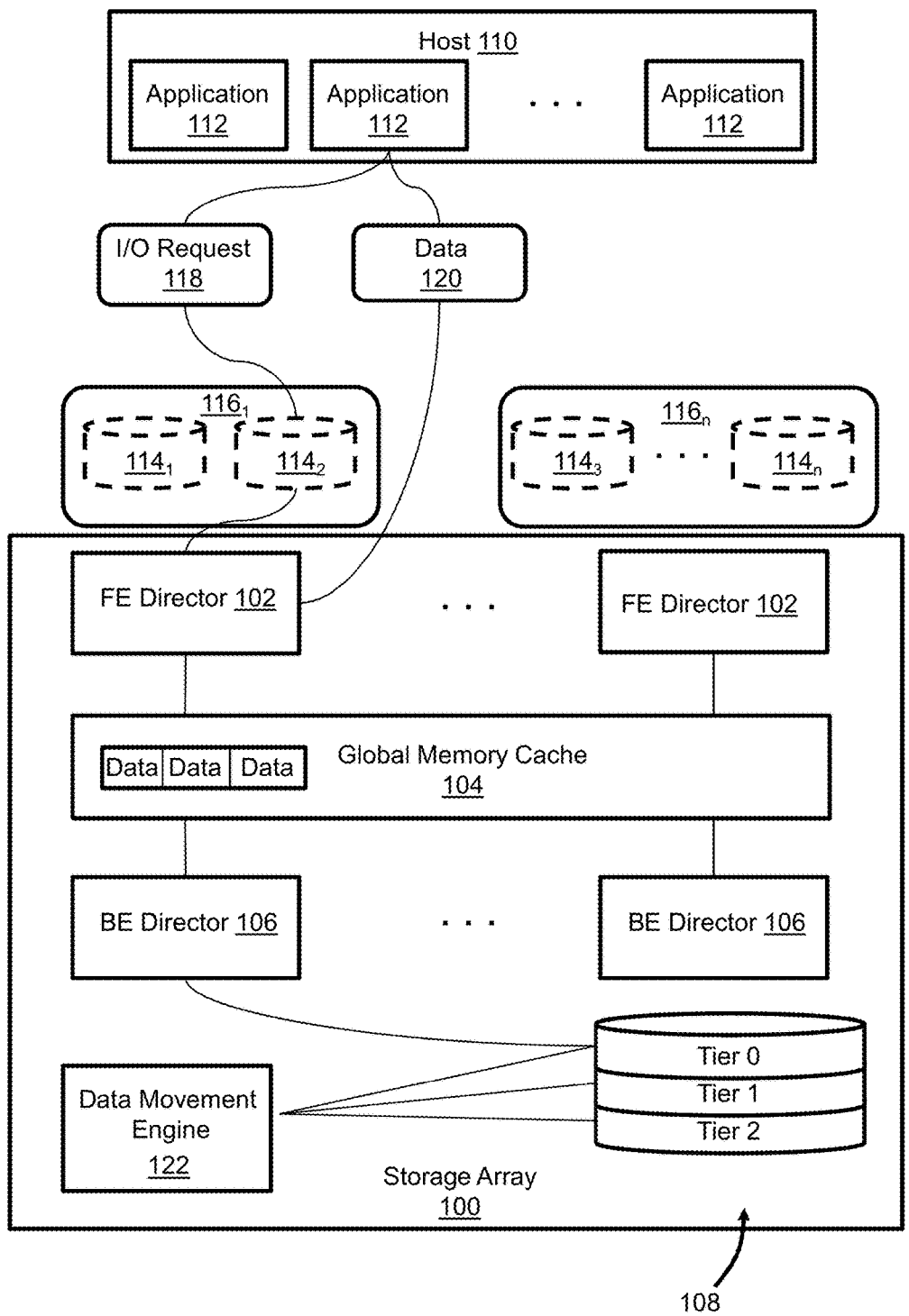
FIG. 1 illustrates a storage system including a storage array and a host device.

FIG. 1 illustrates a storage system which includes a storage array 100. Those skilled in the art will appreciate that the storage system could include a cluster of storage servers or other devices and architectures. The storage array 100 maintains data and supports IOs associated with a large number of concurrent users. Subsystems of the storage array 100 include FE (front end) storage directors 102, a global memory cache 104, BE (back end) storage directors 106, and non-transitory physical data storage devices (typically referred to as "data devices") 108.

The global memory cache 104 is illustrated as a single logical memory resource. However, the global memory cache could be implemented in multiple non-transitory physical memory devices. For example and without limitation, the global memory cache could be implemented as multiple volatile memory components such as RAM (random access memory) chips. The memory components may be distributed across multiple physical subsystems, e.g., on separate printed circuit boards associated with different ones of the storage directors 102, 106. However, other types of memory components could be used and the chips are not necessarily distributed on multiple subsystems.

The non-transitory physical storage devices 108 are organized into hierarchical tiers. In the simplified example of FIG. 1 the storage devices are organized as tier 0 through tier 2. Different technology types of physical storage devices have different performance characteristics and different costs per unit of storage capacity. Each tier may be associated with a particular technology type of physical storage device. For example and without limitation, the physical storage devices 108 may include one or more flash drive (e.g., EFDs (enterprise flash drive)) pools at tier 0, one or more FC (Fibre Channel) pools at tier 1, and one or more SATA (serial advanced technology attachment) pools at tier 2. There may be greater storage capacity at tier 2 than at tier 1, and greater storage capacity at tier 1 than at tier 0. However, a wide variety of implementations are possible in terms of the number of pools, tiers, types of storage devices used at the tiers, and storage capacity at each tier.

Computing devices such as user terminals and servers use the data maintained in the storage array 100 by communicating with a host device 110. The host device may be a type of server which hosts one or more instances of an application 112, e.g., a database, for example and without limitation. The storage array 100 may create logical storage devices $114_{1-n}$ for the application 112, although a system admin might create the logical storage devices for any of a variety of purposes. The FE storage directors 102, which include processor components which run programs, present the logical storage devices to the host device 110. The logical storage devices, which may be referred to as or by LUNs (logical unit numbers), may be represented as a set of contiguous address spaces locations in a thinly provisioned virtual volume. The storage capacity allocation associated with the logical devices can change over time, e.g., increasing in response to Writes by the application. The application and the host device will typically be unaware of the actual location of data on the physical storage devices 108. An IO request 118 sent by an instance of the application 112 running on the host device 110 to the storage array 100 in order to Read or Write data will reference a location in a particular logical storage device, e.g., logical storage device $114_2$. The storage array maintains a mapping between the logical storage devices and the physical storage devices. As will be discussed in greater detail below, the data stored on each logical storage device may be distributed across multiple tiers of the storage devices 108.

Multiple logical storage devices may be organized into a storage group (sometimes abbreviated as SG). The illustrated example includes SGs $116_{1-n}$. Each logical storage device can belong to up to one storage group. Each storage group may be associated with SLOs (service level objectives) which indicate one or more performance parameters which are demanded or requested by the storage group. For example, a SLO may indicate one or more performance parameters which enable the associated application to provide a target level of performance or user experience. Failing to satisfy the SLO does not necessarily cause the application to become non-functional but user experience may fall below expectations. For context and without limitation, IO response time is a possible example of an SLO performance parameter.

A section of the global memory 104 is used to temporarily store selected data. For example, data may be copied to the global memory 104 from the storage devices 108 in response to a hint or an IO Read request 118 by the host device 110. This can enhance system performance because when data 120 corresponding to IO request 118 is in the global memory 104, i.e., a "cache hit," then that cached copy of the data can be used to quickly service the IO request. When the requested data 120 is not in the global memory, i.e. a "cache miss," then that data must be copied by a BE director 106 from the storage devices 108 into the global memory 104 in order to service the IO request. Data associated with an IO Write request is initially written to global memory 104 and subsequently flushed from global memory and written to the storage devices 108. Generally, any data that has not been accessed recently or within a predetermined period of time may be flushed from global memory 104 and written to the storage devices 108. The storage directors may operate in parallel such that IO requests are concurrently serviced and the failure of one director does not cause the failure of other directors.

A data movement engine 122 selects the tier of storage on which each extent of data is stored, including prompting movement of extents of data between tiers of storage based on various calculations. Movement of data between tiers of storage does not disrupt operation of the application. The data movement engine may include program code stored in non-transitory memory that is used by one or more physical hardware processors to perform calculations and prompt movement of data between tiers based on expected activity (sometimes referred to simply as "activity"), system performance objectives and SLOs. Expected activity may be determined from a wide variety of forecasts including but not limited to events such as recent IOs, e.g., Reads and Writes from the host. Each IO is associated with a response time. System performance objectives may include performance metrics such as an overall target average response time for the storage array 100. SLOs are indicative of the performance experience of individual applications, e.g. by measuring a weighted average IO response time of a targeted SG. The data movement engine 122 may calculate an optimal distribution of IOs among tiers 0-2 to achieve a target stable level of system performance and also attempt to satisfy SLOs for each storage group $116_{1-n}$ that is associated with predefined SLOs.

In one implementation the data movement engine 122 performs efficient linear "performance benefit" calculations to determine how to assign storage resources to a data extent being evaluated. A performance benefit score S is calculated for each extent of each storage group SG as follows:

$$S = e^{\alpha_i(\overline{rt_i}-rt_{i0})/min(rt_{i0},\overline{rt_i})} \times$$

$$\left(\beta_i \times \log\left(\frac{\sum_{k=0,\ldots,Max\_SG}\sum_{j=0,\ldots,Max\_extent} sgio^i_j}{\sum_{j=0,\ldots,max\_extent} sgio^i_j + 1}\right) + 1\right) \times \text{Activity}$$

Equation (1)

where

Activity=12*reads_short+3*writes_short+ 3*prefetch_short+4*read_long+writes+prefetch  Equation (1.1)

and where $$\overline{rt_i} = \sum_{j=0,1,\ldots,Max\_extent} ioj * rtj \Big/ \sum_{j=0,1,\ldots,Max\_extent} ioj$$

Equation (1.2)

"i" denotes the i th storage group. "$\overline{rt_i}$" denotes the average response time experienced by accessing data in i-th SG. "ioj" is the number of data IOs into extent I, and "rtj" is the response time for performing an io to j-th extent. The first term, $e^{\alpha_i(\overline{rt_i}-rt_{i0})/rt_{i0}}$, indicates an amount by which the SG is missing its SLO demand goals by comparing the average actual IO response time $\overline{rt_i}$ for the SG i to the SLO demanded IO response time $rt_{i0}$ for the SG i. The first term influences the score S of an extent as a function of the difference between SLO demand and actual performance for the storage group (Sgi) with which the extent is associated. The second term, $$\beta_i \times \log\left(\frac{\sum_{k=0,\ldots,Max\_SG}\sum_{j=0,\ldots,Max\_extent} sgio^i_j}{\sum_{j=0,\ldots,max\_extent} sgio^i_j + 1}\right) + 1$$

is indicative of the cost of more completely satisfying the SG's SLO in terms of the sum of the IO demands of all SLOs, $$\sum_{k=0,\ldots,Max\_SG}\sum_{j=0,\ldots,Max\_extent} sgio^i_j,$$

as compared with the IO demands of the SLO associated with the extent being scored, $$\sum_{j=0,\ldots,max\_extent} sgio^i_j + 1.$$

Hence, the second term influences the score S of the extent as a function of relative SLO improvement efficiency that could be realized by the movement of one unit of IO activity into tier 0 based on a number of IOs for the SG with which the extent is associated and the sum of IOs for all SGs. The third term, Activity, is indicative of forecasted activity of the extent, e.g., in terms of IOs per some period of time. Activity quantifies IO access to extent. In some implementations Activity is a function of reads, writes and preferences that can be estimated for short term and long term. However, a wide variety of weights and variations may be implemented depending on optimization preferences so equation 1.1 should not be viewed as limiting.

The terms $\alpha_i$ and $\beta_i$ are control parameters which are used to assign prioritizing weights to the SLO demand versus actual gap and the SLO achievement improvement cost. It will be appreciated by those skilled in the art that the score is not computationally expensive to calculate. The use of the scores will be explained in greater detail below.

Figure 2:
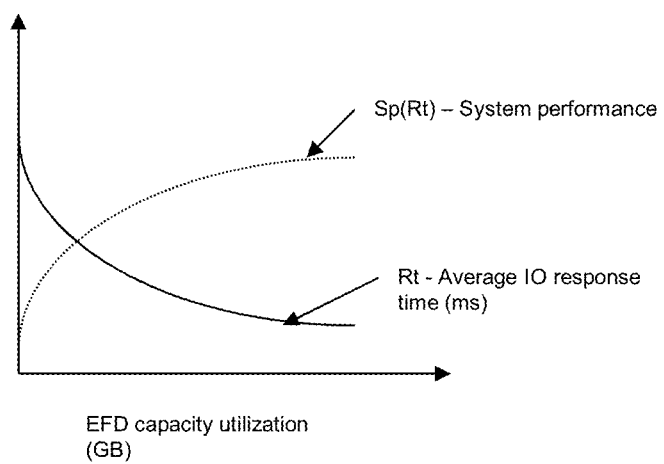
FIG. 2 illustrates the relationship between storage system performance and storage resource capacity utilization.

FIG. 2 illustrates the relationship between system performance and storage resource capacity utilization at tier 0. System performance is expressed in terms of average IO response time, e.g., average response time of the storage array. The average IO response time Rt is inversely related to system performance $Sp(Rt)$, i.e., system performance increases as average IO response time decreases. Capacity utilization of high performance tier (or pools) such as EFD (or flash) tier (or pools), which affects average response time, is directly related to system performance. This relationship can be expressed as follows:

$$\partial \overline{Rt}/\partial(Edf\_Gb) <= 0 \quad \text{Equation (2)}$$

A function $Sp(\overline{Rt})$ for measuring system performance has the following characteristics:

$$\partial Sp/\partial(Edf\_Gb) >= 0 \quad \text{Equation (3)}$$

Figure 3:
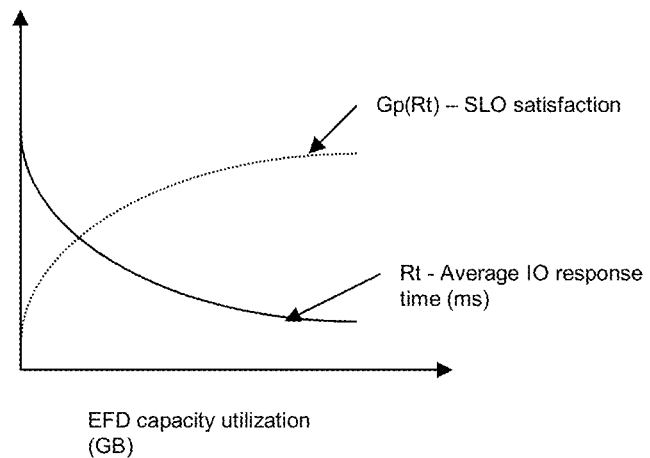
FIG. 3 illustrates the relationship between SLO (service level objective) satisfaction and storage resource capacity utilization.

FIG. 3 illustrates the relationship between SLO satisfaction and storage resource capacity utilization at tier 0. Application performance experience is related to SLO satisfaction and can be measured in terms of the average response time of IOs associated with the application. The application is bound to logical storage devices organized into a SG. The SLO defines a preferred response time distribution or average response time for IOs associated with the SG. In general, the greater the capacity utilization at tier 0 by the SG, the greater the SLO satisfaction measurement is for the SG, and thus the greater the application performance experience. Given a function $Gp(\overline{Rt})$ for measuring SLO satisfaction, the following relationship holds true for SLO measurement:

$$\partial Gp/\partial(Edf\_Gb)=0 \quad \text{Equation (4)}$$

Figure 4:
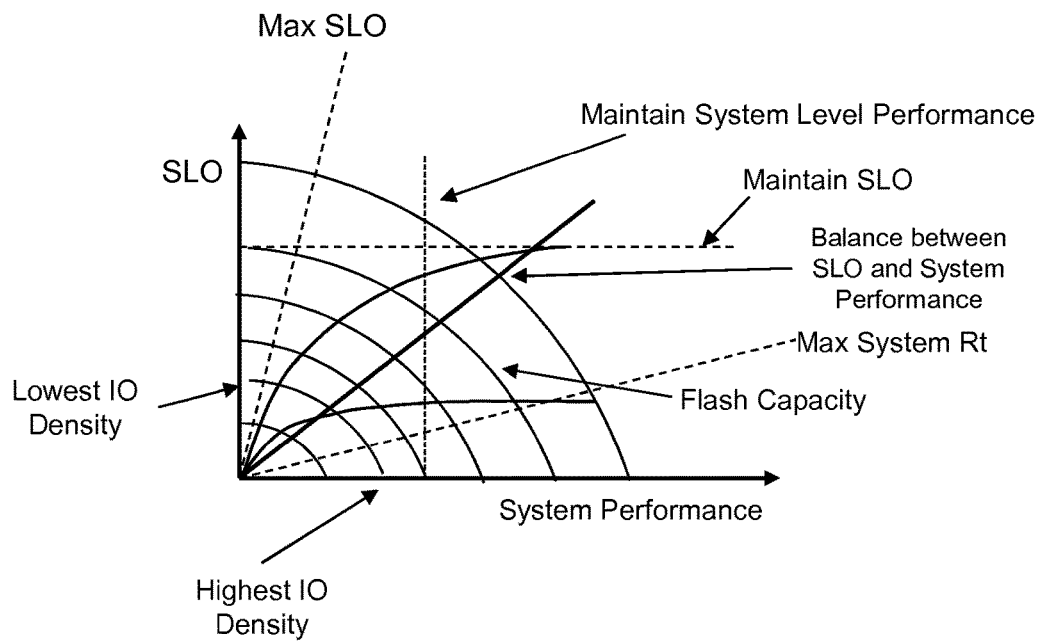
FIGS. 4 and 5 illustrate the relationship between SLO satisfaction and storage system performance.
Figure 5:
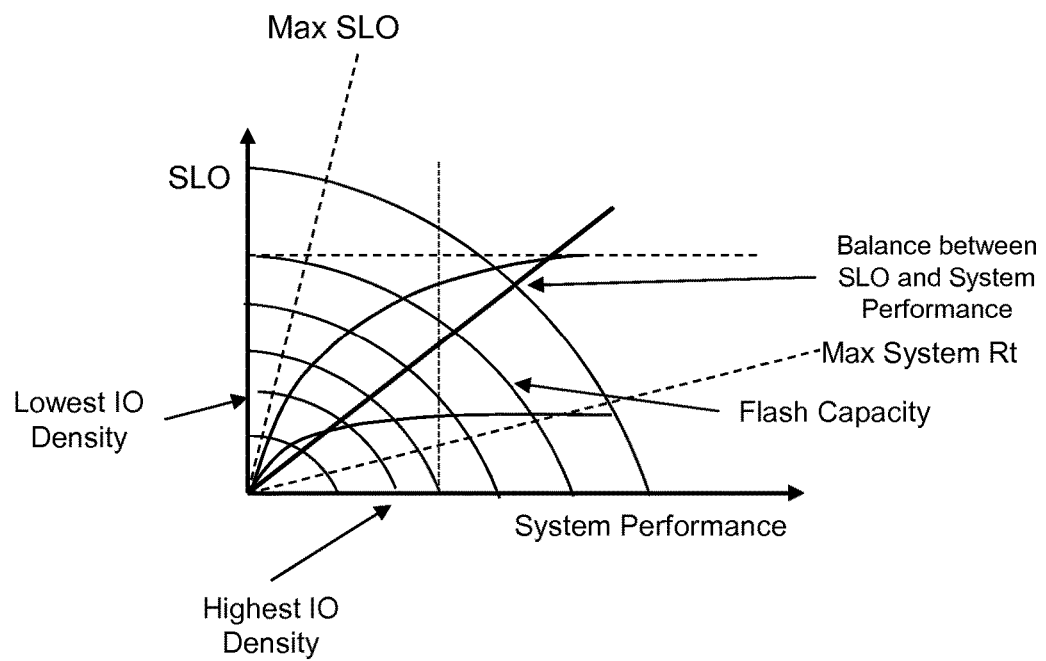

FIGS. 4 and 5 illustrate the relationship between SLO satisfaction and system performance. In general, IO density decreases along the SLO satisfaction axis and increases along system performance axis. As utilization of tier 0 resources increases, both system performance and SLO satisfaction increase. A first boundary, "Max system Rt," represents the condition in which system performance is maximized by selecting into tier 0 the data extents with the highest IO density, which are the most active extents. A second boundary, "Max SLO," represents the condition in which data extents representing the highest percentile of SG IOs are selected into tier 0. Distribution points in an area between the Max System Rt boundary and the Max SLO boundary represent different prioritizations of system performance relative to SLO satisfaction. Under special cases where there is only one SG the Max SLO and Max System Rt boundaries may merge.

Figure 6:
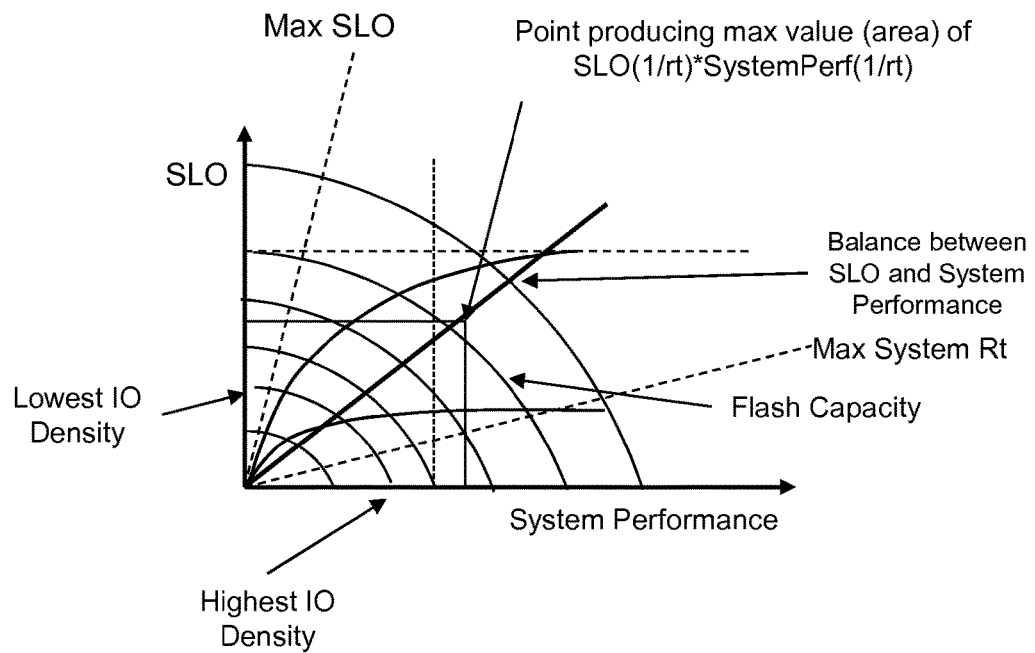
FIG. 6 illustrates an area corresponding to a maximum value as a function of both system performance Sp and SLO satisfaction.

Referring to FIG. 6, both system performance Sp and SLO satisfaction Gp are functions of workload distribution over tier 0 storage pools. The workload distribution is determined by both pool capacity utilization and workload IO activity as described in equations (5) and (6). The symbol SG_Pool_IOij denotes the activity of i-th SG being distributed onto j-th pool and symbol SG_Pool_GBij denotes the capacity of i-th SG being distributed onto j-th pool along with activities.

$$Sp = Sp(SG\_Pool\_IO_{00}, SG\_Pool\_GB_{00}, \\ SG\_Pool\_IO_{nn}, SG\_Pool\_GB_{nn}) \quad \text{Equation (5)}$$

$$Gp = Gp(SG\_Pool\_IO_{00}, SG\_Pool\_GB_{00}, \\ SG\_Pool\_IO_{nn}, SG\_Pool\_GB_{nn}) \quad \text{Equation (5)}$$

The optimal data placement for maximizing both system performance and SLO satisfaction is found when following condition holds true:

$$\delta(Sp*Gp)=0 \quad \text{Equation (7)}$$

Figure 7:
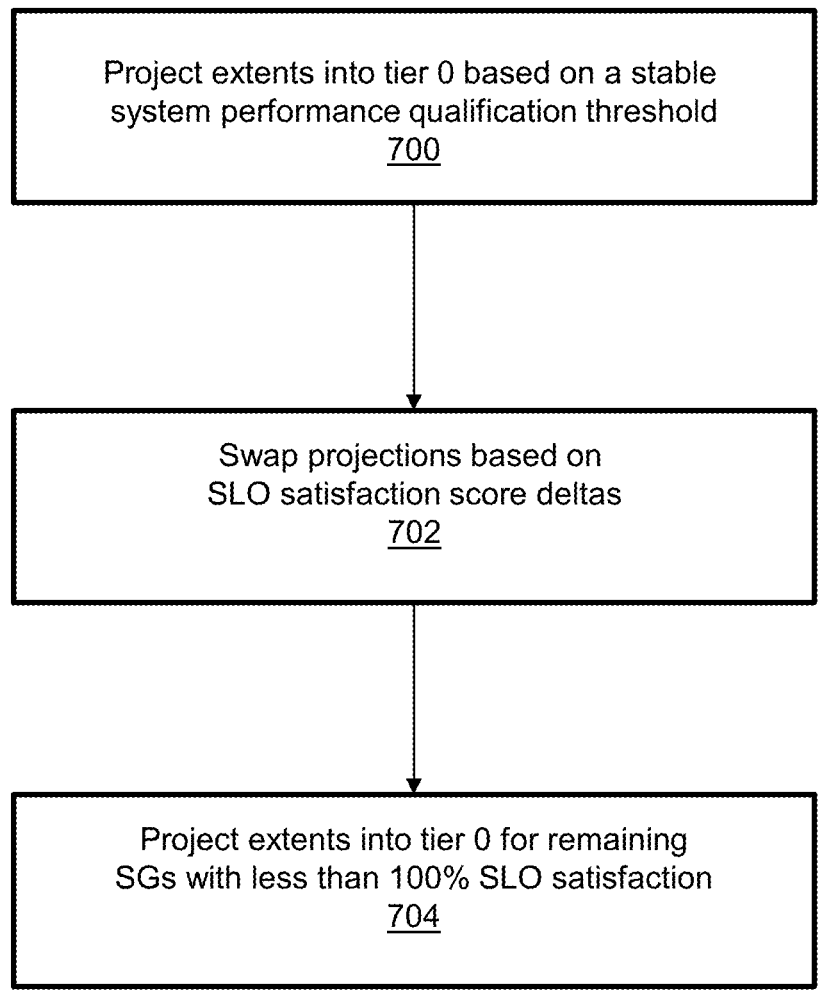
FIG. 7 illustrates a process for resource distribution calculations for maximizing both system performance and SLO satisfaction by the data movement engine for a single tier.
Figure 8:
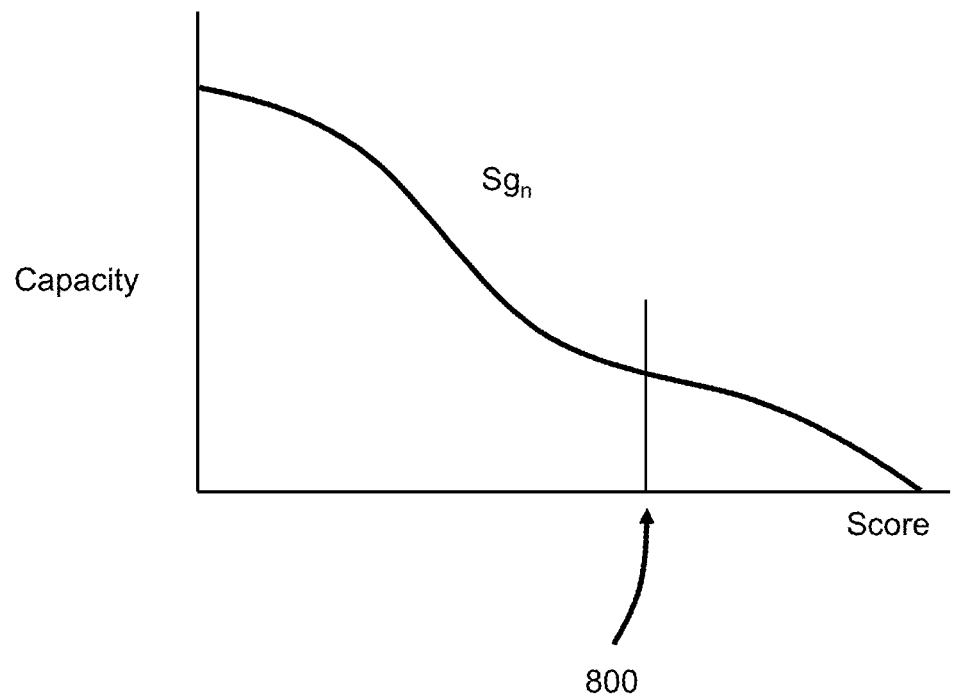
FIG. 8 illustrates a histogram or skew curve for one SG.
Figure 9:
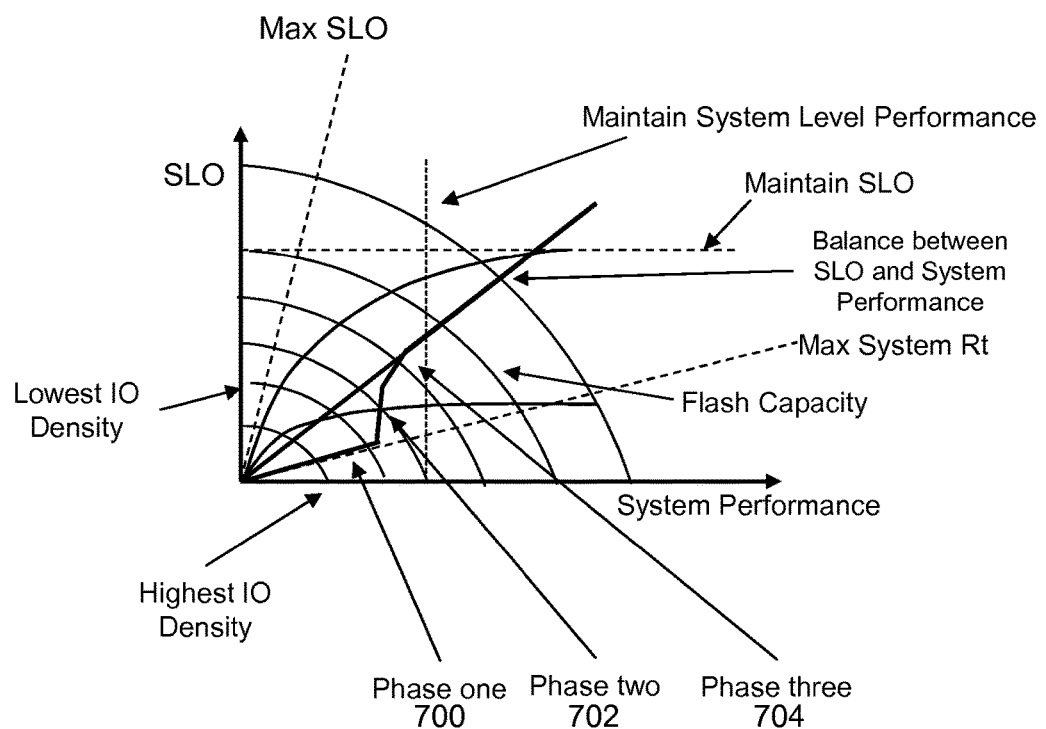
FIG. 9 illustrates the three phases of the process for resource distribution calculations for maximizing both system performance and SLO satisfaction by the data movement engine plotted on a graph of SLO versus system performance.

FIGS. 7, 8 and 9 illustrate resource distribution calculations for maximizing both system performance and SLO satisfaction by the data movement engine for a tier, e.g. an EFD pools in tier 0. In a first phase 700 a workload distribution is projected based on IO density to achieve stable system performance. In order to do this a score S is calculated for each extent of each SG based only on activity, i.e., with both $\alpha_i$ and $\beta_i$ set to zero using Eq. 1. Bin values, which may include but are not limited to one or more of total number of tracks, total number of reads, total number of writes, total number of pre fetches, average read size and average writes size are accumulated over all extents within each SG. A bin index is the score qualification threshold of each bin to be projected onto target pools. The bin values in each bin versus the bin index produce a histogram or skew curve. A histogram or skew curve for an exemplary SG ($Sg_n$) is shown in FIG. 8. The set of histograms for all SGs can be used to project resources in a coordinated manner.

A score threshold 800 for qualifying an extent to be projected into tier 0 is determined for all SGs based on predetermined stable system performance characteristics. For example and without limitation, the stable system performance might include predetermined maximum levels of workload activity that can be handled by storage pools at each tier. In the histogram of FIG. 8, extents to the right of the threshold 800 are projected into tier 0. As shown in FIG. 9, this may result in projection of tier 0 resources along the "max system Rt" boundary up to a point corresponding to the minimum amount of tier 0 capacity utilization required for stable system performance, e.g., only up to the capacity utilization required to avoid overloading lower performing storage pools in other tiers.

Figure 10:
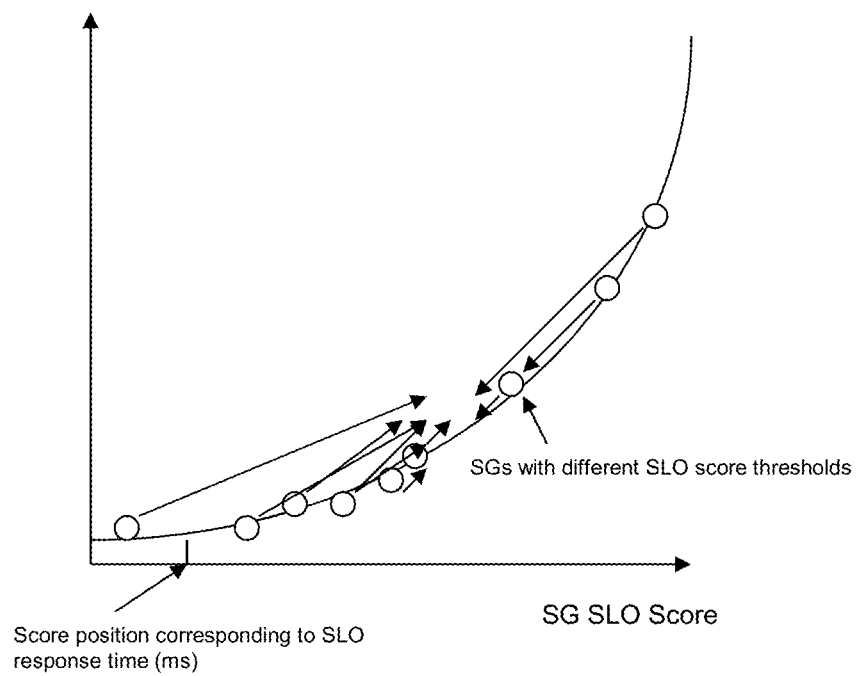
FIG. 10 illustrates the swapping phase.

Referring to FIGS. 7, 8, 9 and 10, in the second phase 702 some or all of the remaining unutilized capacity at tier 0 is allocated via swaps based on SLO satisfaction scores, but only if there are remaining available resources in tier 0 following completion of the first phase. SLO satisfaction scores represent the difference between a current level of SLO satisfaction and 100% SLO satisfaction for a given SG. An SLO satisfaction score is calculated for each SG. SGs that have not achieved 100% SLO satisfaction are sorted according to SLO satisfaction score and categorized as SG donors or SG receivers based on classifications which will be discussed below. In order to increase SLO satisfaction and reduce the deltas between SLO satisfaction scores of different SGs that have not achieved 100% SLO satisfaction the SG donors and SG receivers swap projected extent placements. SG donors release tier 0 extent projections to SG receivers and accept lower tier extent projections in exchange, while SG receivers release lower tier extent projections to SG donors and accept tier 0 extent projections in exchange. The assignment of "donors" and "receivers" for each SG is based on SLO satisfaction determined by the difference between desired response time $_{rt_{i0}}$ and average response time calculated for each SG via equation 1.1. If ($\overline{rt_i} - _{rt_{i0}}$) is positive for sg_i then Sg_i is considered to be below SLO and if ($\overline{rt_i} - _{rt_{i0}}$) is negative then sg_i is considered to be over SLO, otherwise sg_i is considered as "at slo" where ($\overline{rt_i} = _{rt_{i0}}$). After each exchanging tier 0 projection between donors and receivers the SLO achievement state is re-evaluated via the above-described process and the state of "donors" and "receivers" are reassigned for each SG. This may be done via iterative calculations using the described equations and variations thereof, where an iteration ends when either all donor SGs have donated or all receivers SGs have received. After each iteration the extent scores are recalculated with non-zero values for the $_{\alpha_i}$ and $\beta_i$ coefficients (eq. 1) in order to "rescale" the SG histograms. The score threshold of qualifying for tier 0 in the first phase will "split" into multiple thresholds after rescaling. The second phase 702 is completed when either there are no remaining storage resources at tier 0 or all SGs that have not achieved 100% SLO satisfaction have the same SLO score. SGs that attain 100% SLO satisfaction are not considered as potential SG receivers in swap operations. FIG. 9 illustrates the effect of the second phase on the plot of SLO satisfaction versus system performance. FIG. 10 illustrates convergence of SG donors and SG receivers to a common SLO satisfaction score.

Once the second phase is complete, a third phase 704 commences if there are SGs that have not reached 100% SLO satisfaction and there is unutilized capacity at tier 0. In the third phase the remaining unutilized capacity at tier 0 is used to further satisfy SG receivers that have not reached 100% SLO satisfaction. Unutilized capacity is projected for the SG receivers in a uniform manner which maintains the SLO score delta of zero. SGs that attain 100% SLO satisfaction are no longer considered as potential SG receivers. The third phase is complete when either all SGs have achieved 100% SLO satisfaction or there are no remaining resources at tier 0. FIG. 9 illustrates the effect of the third phase on the plot of SLO satisfaction versus system performance.

Figure 11:
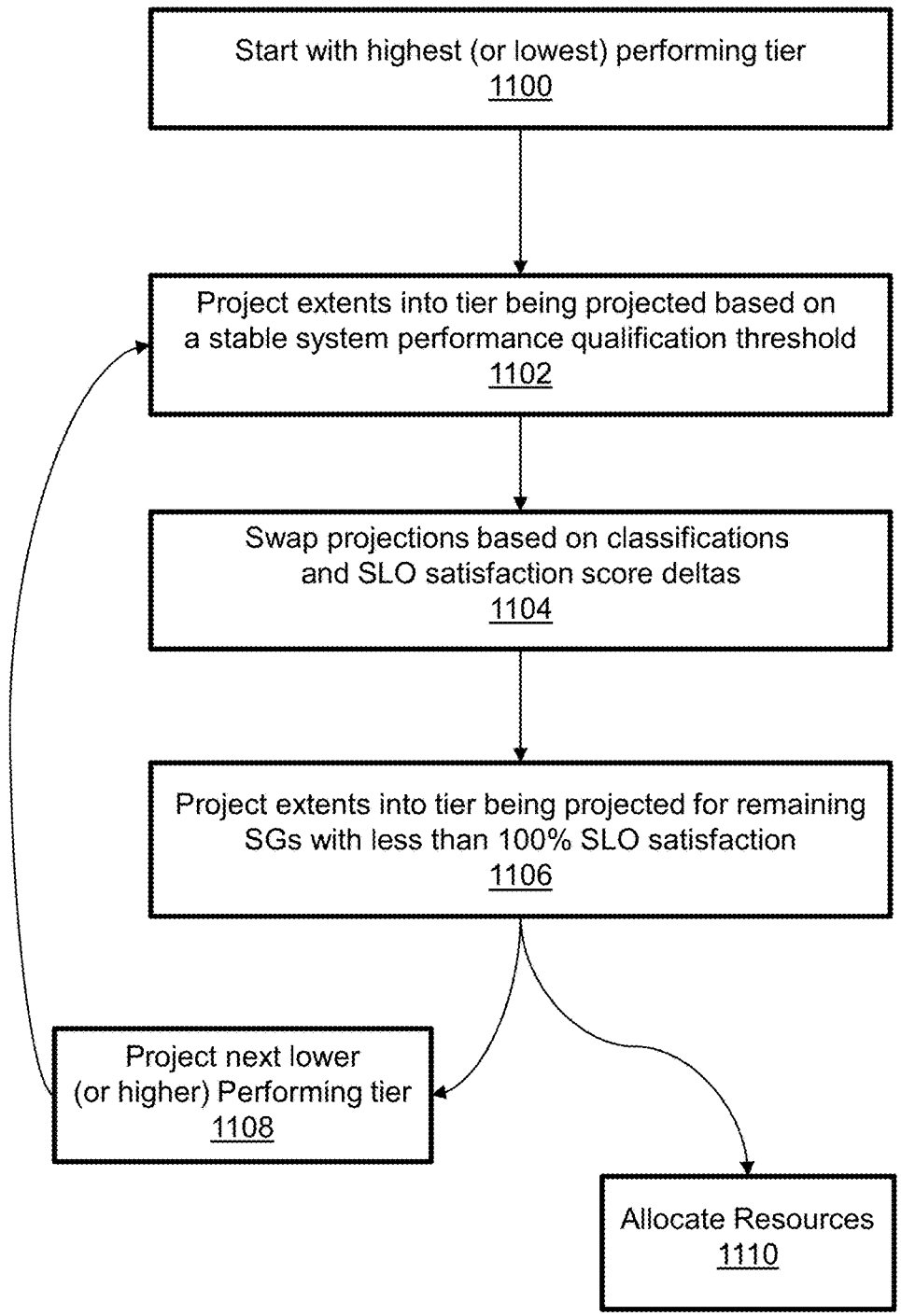
FIG. 11 illustrates a process for resource distribution calculations for maximizing both system performance and SLO satisfaction by the data movement engine for multiple tiers.

Implementation of the technique over multiple tiers (e.g., tiers 0-2) is illustrated by FIG. 11. In a multi-tier implementation it is possible to start with either the highest performing tier or the lowest performing tier. Variations for starting with the lowest performing tier are indicated parenthetically. Beginning with the highest (or lowest) performing tier at 1100, the first phase 1102 is to project storage capacity to achieve system performance objectives, e.g., a "stable" system in terms of a maximum activity supported by the next lower performing tier (or the tier being projected). Scores for all extents for all SGs with SLOs are calculated using equation 1 using zero values for both $_{\alpha_i}$ and $\beta_i$ coefficients. As discussed above, the set of scores for each SG can be represented as a histogram of extents over IO activity. A qualification score threshold for the tier being projected is calculated based on the maximum activity that the next lower performing tier (or the tier being projected) can support according to the system performance objectives. Extents having scores which satisfy the threshold condition are projected into the tier being projected. The second phase 1104 is to swap activity/projections between SG donors and SG receivers as already described above. In particular, virtual extent projections from the next lower performing tier (or higher performing tier) are swapped for extent projections into the tier being projected. The third phase 1106 is to further satisfy SG receivers that have not reached 100% SLO satisfaction by making further projections into the tier being projected.

In order to project the next lower (or higher) performing tier as indicated at 1108, the first phase 1102 is repeated for the next lower (or higher) performing tier. In the case where the first phase is repeated for the next lower performing tier, e.g. tier 1, A qualification score threshold is calculated for projection into tier 1 based on the maximum activity that tier 2 can support according to the system performance objectives. Extents having scores which satisfy the threshold condition are projected into tier 1. The second phase 1104 is then repeated for tier 1, swapping between SG donors and SG receivers as already described above. In particular, tier 2 extent projections of SG receivers are swapped for tier 1 projections of SG donors. The third phase 1106 is repeated for tier 1 to further satisfy SG receivers that have not reached 100% SLO satisfaction by making further tier 1 projections. The remaining extents are projected into tier 2. The phases can be repeated for any number of tiers. When all of the tiers have been projected the resources are allocated in accordance with the projection at 1110.

Figure 12:
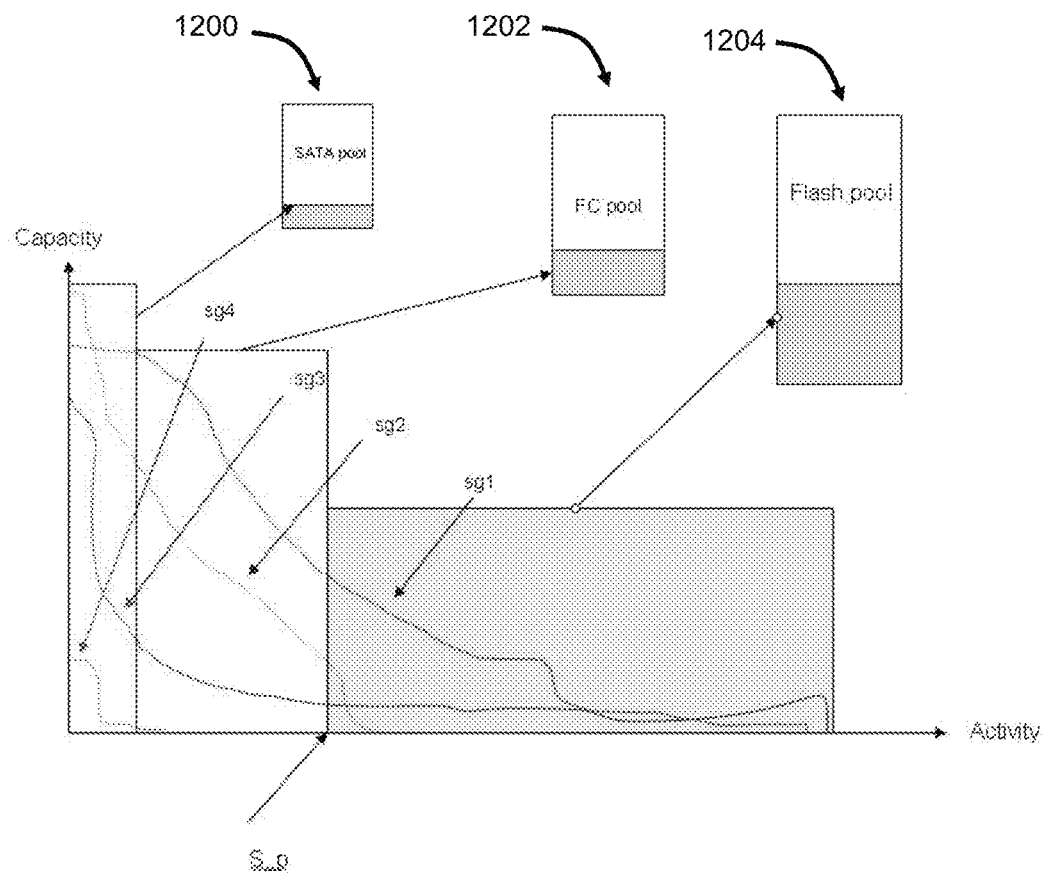
FIGS. 12 and 13 illustrate histogram rescaling and graph resource distribution calculations for maximizing both system performance and SLO satisfaction by the data movement engine for multiple tiers.

FIG. 12 illustrates projections of storage capacity to achieve system performance objectives in accordance with the first phase 1100 (FIG. 11). The capacity utilization of projections for each of the tier 2 SATA pool 1200, tier 1 FC pool 1202, and tier 0 Flash pool 1204 relative to total capacity are indicated by shaded areas.

Figure 13:
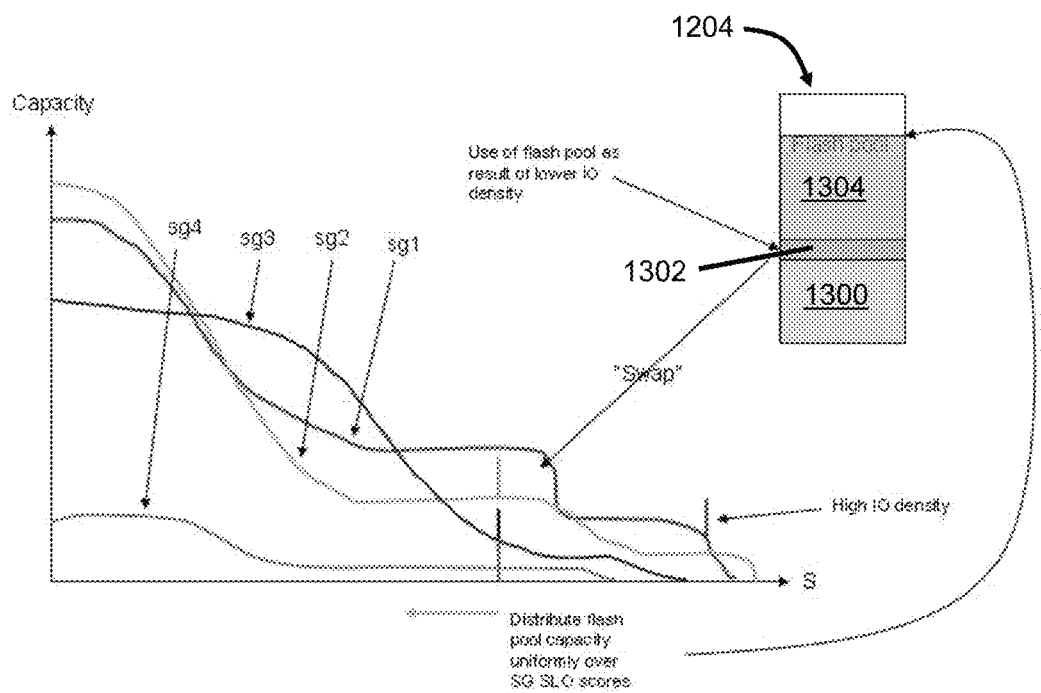

FIG. 13 illustrates an area 1300 indicative of capacity utilization projected in association with the first phase 1102 (FIG. 11), an area 1302 indicative of capacity utilization projected in association with the second phase 1104 (FIG. 11), and an area 1304 indicative of capacity utilization projected in association with the third phase 1106 (FIG. 11). Histograms for SGs sg1 through sg4 in FIGS. 12 and 13 also show the rescaling described above.

Figure 14:
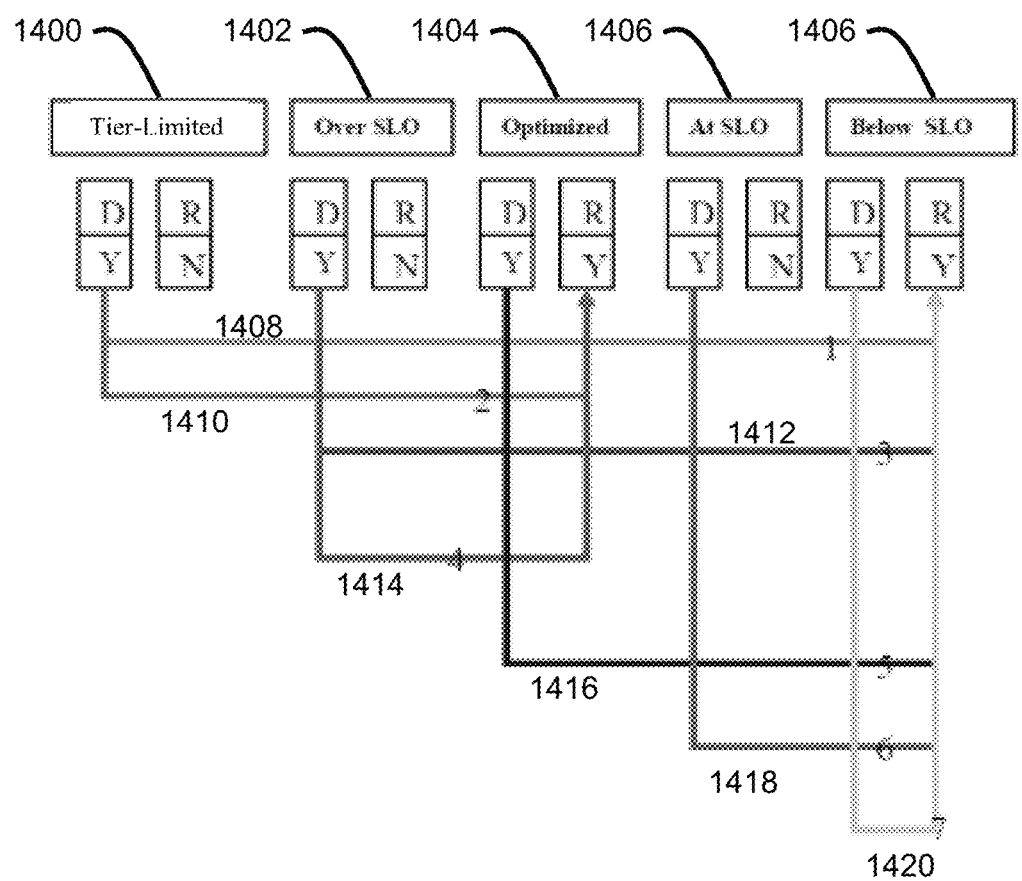
FIG. 14 illustrates prioritized swap classifications.

FIG. 14 illustrates a relationship between SG classifications and swap operations. Each SG is evaluated and assigned to one of the five classes: Tier-Limited 1400, Over SLO 1402, Optimized 1404, at SLO 1406, and Below SLO 1408. The Tier-Limited class could include SGs with a subscribed level of service that prohibits use of tier 0 resources. The Below SLO class includes SGs with actual performance that fails to satisfy a subscribed SLO performance level, i.e., under 100% SLO satisfaction. The Optimized class could include SGs with best efforts type SLOs, e.g., no guarantees. The Over SLO class includes SGs with actual performance that exceeds a subscribed SLO performance level, i.e., greater than 100% SLO satisfaction. Each class is marked with a yes (Y) or no (N) to indicate potential as a donor (D) and receiver (R) of targeted resources, e.g., tier 0 resources. Swaps are prioritized based on the delta between donor and receiver priority. In the illustrated example the donor priority decreases from left to right and the receiver priority increases from left to right. The Tier-Limited class 1400 includes the highest priority SG donors and the Below SLO class includes the highest priority SG receivers. The highest priority swap 1408 is therefore between a SG donor of the "Tier-Limited" class 1400 and a SG receiver of a "Below SLO" class 1406. In a next lower priority swap 1410 a SG of the "Tier-Limited" class 1400 donates its projected allocation of the flash pool to a SG receiver of an "Optimized" class 1406. The Optimized class is a lower priority receiver than the Below SLO class. The next lower priority swap 1412 is between a SG donor of the "Over SLO" class 1402 and a SG receiver of the "Below SLO" class 1406. The next lower priority swap 1414 is between a SG donor of the "Over SLO" class 1402 and a SG receiver of the "Optimized" class 1406. The next lower priority swap 1416 is between a SG donor of the "Optimized" class and a SG receiver of the "Below SLO" class. The next lower priority swap 1418 is between a SG donor of the "At SLO" class and a SG receiver of the "Below SLO" class. The next lower priority swap 1420 is between a SG donor of the "Below SLO" class and another SG of the "Below SLO" class, e.g., to equalize SLO score deltas as described above. After each iteration all SGs are re-evaluated and re-assigned into one of the five illustrated classes. For example, a SG that is classified as Below SLO may be reclassified to AT SLO after being a receiver in an iteration if it receives sufficient resources to be reclassified, and a SG that is classified as Over SLO may be reclassified to At SLO after being a donor in an iteration if it donates sufficient resources to be reclassified. If sufficient resources are available then eventually all of the SGs with SLOs will be classified as At SLO.

Some aspects, features and implementations may comprise computer components and computer-implemented steps or processes that will be apparent to those skilled in the art. For example, it should be understood by one of skill in the art that the computer-implemented steps or processes may be stored as computer-executable instructions on a non-transitory computer-readable medium. Furthermore, it should be understood by one of skill in the art that the computer-executable instructions may be executed on a variety of physical processor devices. For ease of exposition, not every step or element is described herein as part of a computer system, but those skilled in the art will recognize steps and elements that may have a corresponding computer system or software component. Such computer system and software components are therefore enabled by describing their corresponding steps or elements, and are within the scope of the disclosure.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
   a data storage system comprising:
      a plurality of non-transitory data storage devices each having a performance capability, where ones of the storage devices having a common performance capability are grouped together in a storage tier and the data storage system includes multiple storage tiers;
      a processor which presents logical storage devices to an application, the logical storage devices being backed by the non-transitory storage devices, ones of the logical storage devices being grouped together in a storage group, each storage group being associated with a service level objective, where the data storage system includes multiple storage groups; and
      a data movement engine configured to:
         calculate a projection of extents of data into ones of the storage tiers to improve satisfaction of the service level objectives of the storage groups while maintaining stable system performance, the projection based on a calculation for each extent comprising:
            expected activity of the extent;
            an amount by which the storage group associated with the extent is missing its service level objective, and
            a cost of more completely satisfying that service level objective of the storage group associated with the extent; and
         allocate storage capacity in accordance with the calculated projections.

2. The apparatus of claim 1 wherein the data movement engine is configured to calculate a projection of extents of data, based on expected activity of the extents, into ones of the storage tiers to realize stable data storage system performance which does not exceed the performance capabilities at each storage tier.

3. The apparatus of claim 1 wherein the data movement engine is configured to calculate the projection of extents for each tier of storage sequentially beginning with a highest performing storage tier.

4. The apparatus of claim 1 wherein the data movement engine is configured to project extents of data to improve satisfaction of service level objectives while maintaining stable system performance by swapping projections between storage groups.

5. The apparatus of claim 4 wherein the data movement engine is configured to project extents of data to improve satisfaction of service level objectives while maintaining stable system performance by swapping projections between first and second storage groups with less than complete satisfaction of their respective service level objectives.

6. The apparatus of claim 4 wherein the data movement engine is configured to project extents of data to improve satisfaction of service level objectives while maintaining stable system performance by swapping projections between storage groups based on storage group classifications.

7. The apparatus of claim 4 wherein the data movement engine is configured to project extents of data to improve satisfaction of service level objectives while maintaining stable system performance by uniformly projecting remaining unused storage capacity after swapping projections.

8. The apparatus of claim 1 wherein the data movement engine calculates a score S for each extent as follows:

$$S = e^{\alpha_i(\overline{rt_i} - rt_{i0})/\min(rt_{i0}, \overline{rt_i})} \times \left( \beta_i \times \log\left( \frac{\sum_{k=0,\ldots,Max\_SG} \sum_{j=0,\ldots,Max\_extent} sgio^i_j}{\sum_{j=0,\ldots,max\_extent} sgio^i_j + 1} \right) + 1 \right) \times \text{Activity}.$$

9. The apparatus of claim 8 wherein the data movement engine calculates a threshold for projection into a storage tier and compares the score S with the threshold in order to qualify the extent to be moved into that tier.

10. A method comprising:
    calculating a projection of extents of data into ones of the storage tiers to improve satisfaction of service level objectives of storage groups while maintaining stable system performance, the projection based on a calculation for each extent comprising:
       expected activity of the extent;

an amount by which the storage group associated with the extent is missing its service level objective, and a cost of more completely satisfying that service level objective of the storage group associated with the extent; and allocating storage capacity in accordance with the calculated projections.

11. The method of claim 9 further comprising calculating a projection of extents of data, based on expected activity of the extents, into ones of a plurality of storage tiers to realize stable data storage system performance which does not exceed the performance capabilities at each storage tier.

12. The method of claim 9 further comprising calculating the projection of extents for each tier of storage sequentially beginning with a highest performing storage tier.

13. The method of claim 9 further comprising calculating the projection of extents of data to improve satisfaction of service level objectives while maintaining stable system performance by swapping projections between storage groups.

14. The method of claim 13 further comprising calculating the projection of extents of data to improve satisfaction of service level objectives while maintaining stable system performance by swapping projections between first and second storage groups with less than complete satisfaction of their respective service level objectives.

15. The method of claim 13 further comprising calculating the projection of extents of data to improve satisfaction of service level objectives while maintaining stable system performance by swapping projections between storage groups based on storage group classifications.

16. The method of claim 13 further comprising calculating the projection of extents of data to improve satisfaction of service level objectives while maintaining stable system performance by uniformly projecting remaining unused storage capacity after swapping projections.

17. The method of claim 9 further comprising calculating a score S for each extent as follows:

$$S = e^{\alpha_i(\overline{rt_i} - rt_{i0})/\min(rt_{i0}, \overline{rt_i})} \times \left( \beta_i \times \log \left( \frac{\sum_{k=0,\ldots,Max\_SG} \sum_{j=0,\ldots,Max\_extent} sgio_j^i}{\sum_{j=0,\ldots,max\_extent} sgio_j^i + 1} \right) + 1 \right) \times Activity.$$

18. The method of claim 17 further comprising calculating a threshold for projection into a storage tier and compares the score S with the threshold in order to qualify the extent to be moved into that tier.

19. An apparatus comprising:
a data storage system comprising:
a plurality of non-transitory data storage devices each having a performance capability, where ones of the storage devices having a common performance capability are grouped together in a storage tier and the data storage system includes multiple storage tiers;
a processor which presents logical storage devices to an application, the logical storage devices being backed by the non-transitory storage devices, ones of the logical storage devices being grouped together in a storage group, each storage group being associated with a service level objective, where the data storage system includes multiple storage groups; and
a data movement engine configured to:
calculate a projection of extents of data, based on expected activity of the extents, into ones of the storage tiers to realize stable data storage system performance which does not exceed the performance capabilities at each storage tier;
calculate a projection of extents of data into ones of the storage tiers to improve satisfaction of the service level objectives of the storage groups while maintaining stable system performance, the projection based on a calculation for each extent comprising:
expected activity of the extent;
an amount by which the storage group associated with the extent is missing its service level objective, and
a cost of more completely satisfying that service level objective of the storage group associated with the extent;
swap projections between storage groups; and
allocate storage capacity in accordance with the calculated projections.

20. The apparatus of claim 19 wherein the data movement engine is configured to calculate a score S for each extent, calculate a threshold for projection into a storage tier, and compare the score S with the threshold in order to qualify the extent to be moved into that tier, the score being a function of the difference between SLO demand and actual performance for the storage group with which the extent is associated and also the cost of more completely satisfying the SLO.

* * * * *